(12) United States Patent
Haverkamp

(10) Patent No.: US 12,064,868 B2
(45) Date of Patent: Aug. 20, 2024

(54) JOINT FOR CONNECTING TWO JOINT ELEMENTS, AND METHOD FOR OPERATING A JOINT

(71) Applicant: Carl Zeiss Industrielle Messtechnik GmbH, Oberkochen (DE)

(72) Inventor: Nils Haverkamp, Aalen (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 0 days.

(21) Appl. No.: 17/737,962

(22) Filed: May 5, 2022

(65) Prior Publication Data
US 2022/0355494 A1    Nov. 10, 2022

(30) Foreign Application Priority Data

May 5, 2021    (DE) ..................... 10 2021 204 519.7

(51) Int. Cl.
*B25J 17/02*    (2006.01)
*B25J 9/06*    (2006.01)
*B25J 9/10*    (2006.01)

(52) U.S. Cl.
CPC ............. *B25J 17/0275* (2013.01); *B25J 9/06* (2013.01); *B25J 9/104* (2013.01)

(58) Field of Classification Search
CPC .............................. B25J 17/0275; B25J 9/104
See application file for complete search history.

(56) References Cited

U.S. PATENT DOCUMENTS

| | | | | |
|---|---|---|---|---|
| 4,246,661 A | * | 1/1981 | Pinson ................. | B25J 17/0275 901/29 |
| 4,804,220 A | * | 2/1989 | Rosheim ............. | B25J 15/0009 403/114 |
| 4,834,761 A | * | 5/1989 | Walters ................ | B25J 17/0275 623/64 |
| 4,928,546 A | * | 5/1990 | Walters ................ | B25J 17/0275 901/29 |
| 2020/0161532 A1 | * | 5/2020 | Wakana ................. | H02N 11/00 |

FOREIGN PATENT DOCUMENTS

| | | |
|---|---|---|
| DE | 102018121806 A1 | 3/2020 |
| DE | 102019201785 A1 | 8/2020 |
| WO | WO-2016182421 A1 * 11/2016 | ............... A61F 2/54 |

OTHER PUBLICATIONS

Office Action issued in German Patent Application No. DE 10 2021 204 519.7, dated Mar. 21, 2022 (from which this application claims priority) and English language translation thereof.

* cited by examiner

*Primary Examiner* — Bobby Rushing, Jr.
(74) *Attorney, Agent, or Firm* — Ewers IP Law PLLC; Falk Ewers

(57) ABSTRACT

A method for operating a joint and a joint for connecting a first joint element to a further joint element are provided. The joint includes the two joint elements, a head element, a socket element, and at least two drive devices. The head element is connected to or formed by the first joint element and the socket element is connected to or formed by the further joint element. The head element and the socket element are mounted movably on one another, and the drive devices are connected via at least one flexible connecting element to the head element or the first joint element, or to the socket element or the further joint element. The at least one connecting element is guided at least section-wise along the head element.

17 Claims, 4 Drawing Sheets

JOINT FOR CONNECTING TWO JOINT ELEMENTS, AND METHOD FOR OPERATING A JOINT

CROSS REFERENCE TO RELATED APPLICATIONS

This application claims priority to German patent application DE 10 2021 204 519.7, filed May 5, 2021, the entire content of which is incorporated herein by reference.

TECHNICAL FIELD

The disclosure relates to a joint for connecting a first joint element to a further joint element.

BACKGROUND

For the movement of movable parts of a measurement device, in particular of a coordinate measurement device, but also for the movement of, for example, end effectors of robots, a kinematic structure of a positioning device can include joints which permit a rotational movement with one or more degrees of freedom, i.e., degrees of rotational freedom. In this connection, a kinematic structure may include a plurality of such joints. For example, a plurality of arms, the latter being connected via the joints, may be arranged in a row in a serial kinematic structure.

Such a configuration of the positioning devices for sensors in the case of measurement devices or end effectors in robots generally require a large amount of construction space and have what are referred to as singularities which, in certain applications, make the positioning difficult.

For example, singularity-induced problems may occur if an element that is to be positioned is to be pivoted about large angles in a plane with which one of the axes of rotation of the joints of the kinematic structure of the positioning device is coplanar.

Furthermore, it is known that kinematic structures with active elements, i.e., elements driven by drive devices, generally for precision applications have extremely disadvantageous hysteresis or bearing and reversing clearances and do not permit positioning at a desired level of accuracy.

This is problematic if conventional measurement arrangements for angle or position measurement are not capable of detecting the error effects mentioned or if a precise detection is highly complicated and costly.

DE 10 2018 121 806 A1 describes a joint for a robot, wherein said joint has a first joint part and a second joint part that are movable relative to one another, and includes an energy storage device arranged between the first joint part and the second joint part. The document also discloses traction means which are configured as cables and which can be part of an actuator device, wherein the actuator device in turn can be connected to the first and to the second joint part.

SUMMARY

It is an object of the disclosure to provide a joint for connecting a first joint element to a further joint element, and a method for operating such a joint, wherein the joint requires little construction space, and has a minor interfering contour and a large actuating region.

The object is achieved by a joint and a method for operating a joint as described herein.

A joint for connecting a first joint element to a further joint element, the joint including the two joint elements, a head element, a socket element and at least two drive devices, is provided. The joint may also be referred to as an active joint. A joint element can in this case form an arm of a kinematic structure, for example of a serial kinematic structure, or part of such an arm. A joint element can be a robot arm, for example. However, it is also conceivable for a joint element to form part of a sensor or a sensor holder of a coordinate measurement device, for example a tactile sensor or for a tactile sensor. If a joint element forms a sensor holder, a sensor can be fastened movably to the joint element via said sensor holder, as a result of which the inertia effect of the joint element on the inertia of the sensor is reduced. It is also possible for the ball and socket joint to connect two arms of a kinematic structure of a positioning device of a coordinate measurement device, with which a sensor can be positioned.

The head element is connected to the first joint element or is formed by the latter. The socket element is connected to the further joint element or is formed by the latter. The connection between joint element and the head element or socket element can be in particular a rigid connection.

The head element and the socket element are mounted movably on one another, in particular movably relative to one another. In this connection, the head element can be mounted in/on the socket element, or vice versa.

For example, the head element can be arranged in a receiving volume of the socket element. The receiving volume of the socket element refers here to a volume which is at least partially enclosed by the socket element. A section of the head element can therefore be mounted movably in the receiving volume of the socket element. For example, the socket element can have or form a concave surface, at/on which an outer surface of the head element is mounted. The socket element can therefore have a bearing surface, in particular a curved bearing surface, for the head element.

However, the socket element does not necessarily have to have or form a bearing surface. It is also possible for the socket element to be annular and for this ring to be mounted movably on a surface of the head element. It is also possible for the head element to be mounted movably in a punctiform manner or in sections on/in the socket element, for example via a three-point bearing or an n-point bearing, where n>3.

In summary, the socket element can have a bearing section for mounting at/on the head element or for the mounting of the head element, which permits the explained relative movement. It is conceivable in this connection for the head element to be mounted on/at the socket element in a sliding, air-mounted or magnetic manner or with a three-point bearing, or for the socket element to be mounted at the head element in accordance with one of the explained types of mounting.

The head element can be in particular spherical or can include a section which is spherical or is at least partially spherical. However, it is also possible for the head element to be cylindrical or to include a section which is at least partially cylindrical. If the head element is spherical, an area of the head element surface section mounted by way of the socket element can be less than ¼ of the total surface of the head element.

The head element can be movable relative to the socket element with one, two or three degrees of rotational freedom. In other words, the head element can be rotatable relative to the socket element about one, two or three axes of rotation, in particular linearly independent axes of rotation which are typically oriented at right angles to one another.

The head element can be formed, for example, from metal or ceramic. Typically, the material of the head element is hard metal. The socket element can also be formed from metal or ceramic.

It is possible for the head element to be arranged in a fixed position and for the socket element to be movable. It is also possible for the socket element to be arranged in a fixed position and for the head element to be movable. Furthermore, it is possible for both the head element and the socket element to be movable.

The drive devices are connected to the head element or to the first joint element via at least one flexible, in particular flexurally slack, connecting element. Alternatively, the drive devices are connected to the socket element or to the further joint element via at least one flexible, in particular flexurally slack, connecting element. The flexible connecting element can be configured in particular as a cable, i.e., as a tension-resistant element. A tensile force, but typically not a compressive force, can be transmitted by the drive device via the at least one connecting element to the corresponding element to which the connecting element is connected. The connecting element can be formed from one or more aramid fibers or from another, typically low-stretch, low-friction and abrasion-proof synthetic fiber material.

It is, for example, possible for each drive device to be connected to the corresponding element via precisely one flexible connecting element. It is also possible for each drive device to be connected to the corresponding element via at least two flexible connecting elements. The number of drive devices can therefore be smaller than or equal to the number of connecting elements. In particular, there can be 2, 3, or 6 drive devices.

It is also possible for a free end of the connecting element to be connected to one element and for a further end to be connected to an output element of the drive device. However, this is not mandatory. It is also conceivable for one element and/or the output element of the drive device to be connected to the connecting element via a suitable coupling element, for example a deflecting pulley. In this case, at least one free end of the connecting element can be connected, for example, to a holding structure.

It is furthermore possible for the joint to include a control device for controlling the drive devices. This can control the drive devices in such a manner that a desired relative position between the joint elements is set.

According to an aspect of the disclosure, the at least one connecting element is guided at least section-wise along the head element. This can mean that the at least one connecting element or a section of the at least one connecting element lies on a section of the surface of the head element. In this case, different connecting elements are guided along different sections of the surface or lie on different sections.

If the drive devices are connected to the head element or to the first joint element via the at least one flexible connecting element, the drive devices can be arranged in a fixed position relative to the further joint element, for example can be connected mechanically to the further joint element. If the drive devices are connected to the socket element or to the further joint element via the at least one flexible connecting element, the drive devices can be arranged in a fixed position relative to the first joint element, for example can be connected mechanically to the first joint element. However, it is also possible for the drive devices not to be mechanically connected either to the socket element or to the head element.

If the head element is configured, for example, as a ball, it is possible for there to be at least one straight line through the center point of the ball and for there to be a projection plane perpendicular to said straight line, wherein at least one section of the one connecting element or each of the plurality of connecting elements is or are arranged inside or on the contour line of the ball in said projection plane.

It is conceivable, for example, for drive devices to be arranged along the pole direction under a pole of such a head element, wherein the south pole is arranged under the north pole along the pole direction. Furthermore, in a projection into the equator plane, said drive devices can be arranged inside the equator line of the head element.

By guiding the at least one connecting element along the head element, a highly space-saving configuration of the joint is advantageously produced, as a result of which the latter takes up little construction space. Furthermore, the claimed configuration advantageously permits a large actuating region with a minor interfering contour. The interfering contour refers here to a spatial region of the joint that is taken up by the structural elements of the joint in the various relative positions of the joint elements with respect to one another. This corresponds substantially to the volume of the head element in the case of the provided joint.

In a further exemplary embodiment, the drive devices are linear drive devices. This advantageously results in as simple and directed generation of force as possible for actuating the element which is connected to the linear drive devices via the at least one connecting element.

In a further exemplary embodiment, the socket element includes an annular element for resting on the head element, and arm elements, wherein the arm elements connect the annular element to the further joint element or are formed by the further joint element. The arm elements can also connect the annular element to a fastening section for the further joint element. The annular element can be a spring steel element.

The arm elements are typically mechanically rigid. In particular, the arm elements can likewise be formed from metal or ceramic, but also from plastic or from carbon fiber material. It is possible for a through opening to be formed between two arm elements. The number of arm elements can be smaller than the number of connecting elements.

In this exemplary embodiment, the ring element, in particular a section of the annular surface, can form the bearing surface for mounting on the head element.

The annular element can be configured in such a manner that the area of the head element surface section enclosed by the annular element is smaller than or equal to $\frac{1}{6}$ of the entire surface.

This advantageously results in simple mechanical manufacturing of the socket element and therefore of the provided joint.

In a further exemplary embodiment, the device includes a position detection device for detecting a relative position between the socket element and the head element, which position detection device is therefore also used for detecting a relative position between the joint elements. The position detection device can include at least one sensor, for example. It is thus possible for the position detection device to include an optical, inductive, capacitive or resistive sensor or a sensor configured in accordance with another function. For example, the position detection device can be configured as an image detection device or as a magnetic field sensor. The position detection device makes it possible to determine, for example, the relative position between head element and socket element, for example by determining a polar angle or azimuth angle in a spherical head element.

It is possible for the position detection device to be arranged in a fixed position relative to the socket element or relative to the head element, in particular to be fastened mechanically rigidly to the corresponding element. It is also possible for the position detection device or parts thereof not to be mechanically connected either to the socket element or to the head element.

This advantageously results in reliable and precise position control being made possible, wherein an actual position can be determined by the position detection device. In this case, the control device mentioned can generate, depending on a desired position, an actuating variable for the drive devices to actuate the latter for setting the desired position or to actuate the latter in such a manner that a difference between the desired position and the actual position is reduced.

In a further exemplary embodiment, the head element and/or the socket element include/includes at least one element for detection by the position detection device, in particular a sensor of the position detection device. It is also possible for the first and/or the further joint element to include the at least one element for detection.

It is possible for both the head element and the socket element to each include elements for detecting their position in a common reference coordinate system, wherein then the position of the socket element and the position of the head element in the reference coordinate system can be determined by the position detection device. If the position detection device is fastened to the head element or to the socket element, it is possible for only the remaining element to include at least one element for detection by the position detection device.

Such an element can be, for example, an optically detectable element, for example a marker. This marker can be detected, for example, by the previously explained image detection device. Then, for example by suitable image evaluation methods, the generated image of the marker can be evaluated to detect a position in a reference coordinate system. This in turn then makes it possible to determine a relative position between the socket element and the head element.

It is also conceivable for the at least one element for detection to be a magnetic element which can be detected by a magnetic sensor of the position detection device. It is possible for the socket element and/or the head element to include a plurality of elements for detection that are arranged in a predetermined relative arrangement with respect to one another in/at the corresponding element. The corresponding position detection can then be performed in accordance with said previously known relative arrangement. This advantageously results in reliable and precise detection which, in turn, permits improved position control, which has been explained above.

In a further exemplary embodiment, the connecting element or the connecting elements is or are at least partially formed by a fiber tube. It is possible for a fiber tube to include a plurality of connecting elements for connecting a drive device to the head element, to the socket element, to the first joint element or to the further joint element, wherein said connecting elements each form a fiber of the fiber tube. However, it is also conceivable for the fiber tube to form the connecting element between the drive devices and the element explained above.

Furthermore, the fiber tube can include fiber elements via which the plurality of connecting elements are connected to one another.

The fiber tube can be configured in such a manner, in particular woven in such a manner, that a fiber portion or mesh portion between the connecting elements is capable of contraction longitudinally and transversely. In this case, the drive devices can introduce driving forces/driving torques into the fiber tube, the latter then reliably transmitting the driving forces to the element connected to the fiber tube.

The presence of a fiber tube which forms the connecting element, or the connecting elements, advantageously permits a reliable transmission of force since an undesirable movement, for example slipping, of the connecting element (s) along the surface of the head element is prevented, or the risk of this is minimized, by the fiber tube.

In a further exemplary embodiment, a fiber tube section between two connecting elements is capable of contraction. This advantageously results in a large actuating region of the joint being able to be provided since this is not restricted by an absent capability of the fibers to contract.

In a further exemplary embodiment, the at least one connecting element is configured as an element for data transmission or includes such an element. For example, the connecting element can include a signal line via which signals for data transmission can be transmitted. Said signal line can be encased, for example, by a protective or insulating material. The signal line can be formed from an electrically conductive material, for example from a metallic material, such as copper. However, it is also conceivable for the signal guiding element to be configured as a glass fiber element. It is possible for only precisely one of the connecting elements, for a plurality, but not all, of the connecting elements, or else for all of the connecting elements to be configured as elements for data transmission. If the connecting element is formed by a fiber tube, precisely one, a plurality, but not all, or else all, of the fibers of the fiber tube can be elements for data transmission. The signal line can be woven, for example, into the fibers or connecting elements. It is possible for the connecting elements or the fibers to be metallized. In this exemplary embodiment, the head element is typically formed from a non-conductive material.

This advantageously results in data transmission being made possible via the joint, as a result of which, for example, a connection for signaling purposes between elements that are coupled to one another via the joint is made possible.

In a further exemplary embodiment, the joint includes at least one guide element for guiding the at least one connecting element. The guide element can be arranged and/or formed in such a manner that the profile of the connecting element has a desired spatial profile. The guide element can be configured, for example, as a deflecting pulley. Of course, other forms of the configuration of the guide element are also conceivable.

It is possible for a guide element to be arranged in such a manner that a connecting element is guided from the drive device by/via/along the guide element to the head element. In other words, the guide element section lying on the head element is arranged behind or after the guide element in a direction from the drive device toward the element which is connected to the drive device via the connecting element. The guide element can be configured in such a manner that a connecting element section that is curved with a predetermined curvature is provided. It is furthermore possible for the guide element in the previously explained projection plane to likewise be arranged inside the contour line of the head element.

This advantageously results in a profile of the connecting elements being able to be adapted to a spatial arrangement of the drive devices relative to the head element or socket element, which permits, for example, a highly space-saving design of the joint.

In a further exemplary embodiment, the guide element is configured as an annular guide element. The at least one connecting element can be guided here through the ring. The configuration of the guide element as an annular element technically advantageously results in the risk of a loss of guidance being able to be reduced, in particular since a connecting element cannot slip out of the ring. This in turn leads to improved operational reliability of the joint.

In a further exemplary embodiment, the number of connecting elements is larger than the number of drive devices. In particular, a drive device can be connected by different sections via two or more than two connecting elements to a head element, a socket element or a joint element. This advantageously results in different relative positions between head element and socket element and therefore between the joint elements being able to be set with a small number of drive devices, which also reduces the energy consumption of and space required by such a joint.

In a further exemplary embodiment, a plurality of connecting elements or a plurality of drive devices are connected to a rigid coupling element, wherein the coupling element is connected to at least one further drive device. The further drive device can be different from the drive devices connected to the connecting elements and can be used in particular for driving the rigid coupling element. The further drive device can be, for example, a rotation drive device, i.e., a device for producing a rotational movement. It is also possible for the further drive device to be a linear drive device. It is furthermore possible for the coupling element in the previously explained projection plane to likewise be arranged inside the contour line of the head element.

It is possible for at least one drive device to transmit a driving force via the rigid coupling element and the plurality of connecting elements connected thereto or the (further) drive devices connected thereto to the head element, socket element or joint element. This can advantageously likewise reduce the number of drive devices required for the setting of a desired relative position.

In a further exemplary embodiment, the connecting points or connecting sections in which the connecting elements are connected to an element, i.e., to the head element, socket element or a joint element, differ from one another. Force can thereby be introduced in different sections and points, which increases the reliability of setting a desired relative position.

Alternatively, such an element is connected in at least one connecting point or connecting section to at least two connecting elements. This can advantageously reduce the number of connecting points or sections, which can advantageously reduce an outlay on manufacturing for such a joint, in particular an outlay on manufacturing for producing connecting points or connecting sections.

A method is moreover provided for operating a joint according to one of the exemplary embodiments described in this disclosure. In this connection, the at least two drive devices are actuated for setting a desired relative position between the first and the further joint element.

For this purpose, the joint can include a control device which can be configured, for example, as a microcontroller or an integrated circuit or can include one such microcontroller or integrated circuit. This control device can likewise form an evaluation device. In particular, the previously explained position detection device can be connected to such a control and evaluation device. The control device can then generate signals for operating the joint, in particular in drive devices.

This results technically advantageously in a plurality of relative positions which can be set in the joint with minor construction space requirements and interfering contour.

In a further exemplary embodiment, the actuation of the drive devices is carried out on an assignment basis, wherein the assignment of control variables of the drive device to a relative position is determined by machine learning methods.

In particular, the assignment can be determined on the basis of what is referred to as training data, wherein, in order to produce training data, predetermined control variables of the drive devices are set and then the relative positions assigned to said control variables are determined, for example by the previously explained position detection device. In other words, a motor position vector which describes the position of the output elements of the drive device can be allocated a relative position (and vice versa).

On the basis of said training data, the methods mentioned can then determine a generally valid assignment of control variables to a relative position, and vice versa. If, therefore, a desired relative position is predetermined, for example by a user or a superordinate application, control variables assigned to said relative position can be determined and set by the assignment determined in such a way.

The training data can be determined here before the joint is commissioned, for example in a calibration operation. It is also conceivable to produce the training data during operation, for example by the control variables set for setting a desired position being determined and the resulting actual position being detected. By this means, the assignment of control variables to the relative position can be updated, as a result of which an adaptive adaptation of the assignment or of the motor position vectors is therefore produced.

This advantageously results in reliable operation of the drive device with high positioning accuracy.

Furthermore, it is possible to control the drive devices in such a manner that a desired friction is set between the at least one connecting element and the head element. Thus, by changing the tensile force, a frictional force between connecting element and head element is also changed. This in turn can set a dynamic behavior of the joint to predetermined properties; in particular frictional values differing from one another for different relative positions can be set.

Furthermore, it is possible to control the drive devices in such a manner that the different mechanical connections between the drive devices via the connecting element(s) and the driven element have different resonant properties, as a result of which predetermined vibration properties can advantageously be set.

It is possible for an actuation of the drive devices for setting a predetermined friction and/or predetermined resonant properties to be likewise carried out on the basis of an assignment, wherein the assignment of control variables of the drive device to friction and/or resonant properties is determined by machine learning methods.

BRIEF DESCRIPTION OF THE DRAWINGS

The disclosure will now be described with reference to the drawings wherein.

DESCRIPTION OF EXEMPLARY EMBODIMENTS

Identical reference signs hereinafter denote elements having identical or similar technical features.

Figure 1:
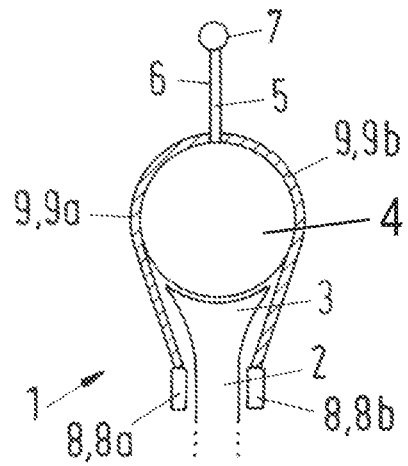
FIG. 1 shows a schematic view of a joint according to a first exemplary embodiment of the disclosure.

FIG. 1 shows a schematic illustration of a joint 1 according to an exemplary embodiment of the disclosure. The joint 1 is used for connecting a first joint element 5 to a further joint element 2, wherein the further joint element 2 has or forms a socket element 3 or a section configured in the manner of a socket.

Furthermore, the joint 1 includes a spherical head element 4 which is mounted in the socket element 3, in particular in a receiving volume of the socket element 3.

The first joint element 5 of the joint, that is configured in the exemplary embodiment illustrated as a tactile sensor of a coordinate measurement device, is mechanically rigidly connected to the head element 4. The sensor includes what is referred to as a probe pin 6 and a probe sphere 7 at the free end of the probe pin 6. The probe pin 6 is mechanically rigidly connected here to the head element 4, for example is screwed into the latter.

Drive devices 8, in particular a first drive device 8a and a second drive device 8b, are furthermore illustrated. Connecting elements 9, namely cable-like connecting elements, which are in particular configured to be flexurally slack, are in each case illustrated. The first drive device 8a, in particular an output element of said drive device 8a, is connected here via a first connecting element 9a to a base point of the probe pin 6, wherein the base point refers to that section of the probe pin 6 which lies directly on a surface of the head element 4. Furthermore, the second drive device 8b, in particular the output element thereof, is connected to the explained base point via a second connecting element 9b.

It is illustrated that the two connecting elements 9a, 9b are guided along the head element, in particular along different sections of the surface of the head element.

It is possible, for example, for drive devices 8a, 8b and/or at least one section of the connecting elements 9a, 9b to be arranged inside the contour line of the head element 4 in a common projection plane which is oriented perpendicularly to a straight line running through the center point of the head element 4.

The straight line through the center point of the head element can be oriented, for example, parallel to a central longitudinal axis of the first joint element 5, in particular if the latter is configured as an elongate element. Alternatively or cumulatively, the straight line can be oriented parallel to a longitudinal axis of the further joint element 2, in particular if the latter is configured as an elongate element.

By operation of the drive devices 8a, 8b, the latter can exert a tensile force on the connecting elements 9a, 9b or can enable a movement of the connecting elements 9b. Thus, for example, a tensile force can be exerted on the first connecting element 9a by the first drive device 8a, while the second drive device 8b enables the movement of the second connecting element 9b. By this means, a tensile force can be exerted on the further joint element 2 and therefore also on the head element 4 which is connected thereto, said tensile force bringing about a rotational movement of the head element 4, in particular a rotational movement about two or three movement axes which can be in particular linearly independent of one another. The drive devices 8, 8a, 8b are typically configured as linear drive devices.

Figure 2:
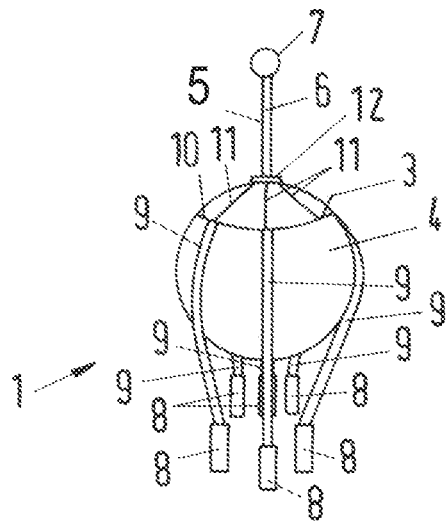
FIG. 2 shows a schematic view of a joint according to a further exemplary embodiment of the disclosure.

FIG. 2 shows a joint 1 in a further exemplary embodiment of the disclosure. Six drive devices 8 which are each connected via connecting elements 9 to a socket element 3 are illustrated. The socket element 3 includes an annular element 10 for resting on the surface of the head element 4, and arm elements 11 which connect the annular element 10 to a fastening section 12 for the further joint element 2. The further joint element 2 is configured as a tactile sensor with a probe sphere 7 and a probe pin 6, wherein a free end of the probe pin 6 is fastened to said fastening section 12. The first joint element 5, which is connected to the head element 4 or forms the head element 4, is not illustrated.

It is apparent that the connecting elements 9 are guided at least in sections along the surface of the head element 4. By corresponding control of the drive devices 8 for exerting a tensile force on the connecting element connected in each case to the drive device 8 or for enabling a movement of the connecting element 9, the socket element 3 can be moved along the surface of the head element 4, as a result of which the further joint element 2 can carry out a rotational movement about a plurality of rotation axes, in particular 3 rotation axes, which are linearly independent of one another.

Figure 3:
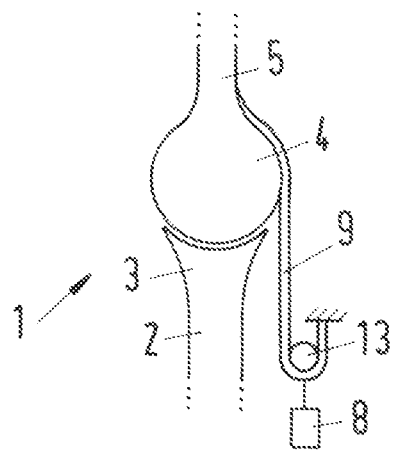
FIG. 3 shows a schematic view of a joint according to a further exemplary embodiment of the disclosure.

FIG. 3 shows a schematic view of a joint 1 in a further exemplary embodiment. It is illustrated that the first joint element 5 forms the head element 4 at one end. It is likewise illustrated that the further joint element 2 forms the socket element 3. In the exemplary embodiment illustrated, for the sake of clarity, only one drive device 8, which is connected via a connecting element 9 to the first joint element 5, is illustrated. A guide element 13 for guiding the connecting element 9, namely a guide element configured as a deflecting pulley, is illustrated. A first end of the connecting element 9 is connected here to the first joint element 5. A further end of the connecting element 9 is connected here to a positionally fixed holding device. An output element of the drive device 8 is connected to the deflecting pulley 13 and via the latter to the connecting element 9.

The exemplary embodiment illustrated in FIG. 3 shows a 1:2 transmission ratio for the driving movement, which leads to the connecting element 9 being moved twice as much as the output element of the drive device 8. A space-saving exemplary embodiment of the joint 1 is thereby achieved.

Figure 4:
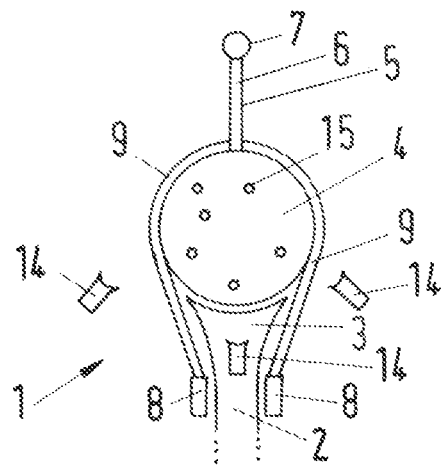
FIG. 4 shows a schematic view of a joint with position detection devices according to an exemplary embodiment of the disclosure.

FIG. 4 shows a schematic view of a joint 1 with position detection devices 14. The joint 1 shown in FIG. 4 is configured here substantially the same way as the joint 1 shown in FIG. 1, and reference may therefore be made to the corresponding explanations concerning FIG. 1. In contrast to the exemplary embodiment illustrated in FIG. 1, the joint 1 includes position detection devices 14 which can be configured, for example, as sensors, in particular optical or magnetic sensors. The head element 4 can here include or form optically or magnetically detectable elements 15. By detection of these elements 15 by the position detection devices 14, a relative (rotational) position between the head element 4 and the socket element 3 and therefore also between the first and the further joint element 5, 2 can be determined, in particular in a reference coordinate system, for example a ball coordinate system arranged in a fixed position relative to the head element 4. Therefore, for example, a position of the degree of longitude and latitude of the ball surface which is arranged in a detection region of a position detection device 14 can be detected.

A control and evaluation device of the joint 1 that can be connected, for example, for data and/or signaling purposes to the position detection devices 14 is not illustrated. This control and evaluation device can then, in accordance with an actual position detected by the position detection devices 14, generate control signals for the drive devices 8 in order to minimize a difference between a desired position and the actual position. Sensor-supported position control is therefore made possible in the joint 1.

Figure 5:
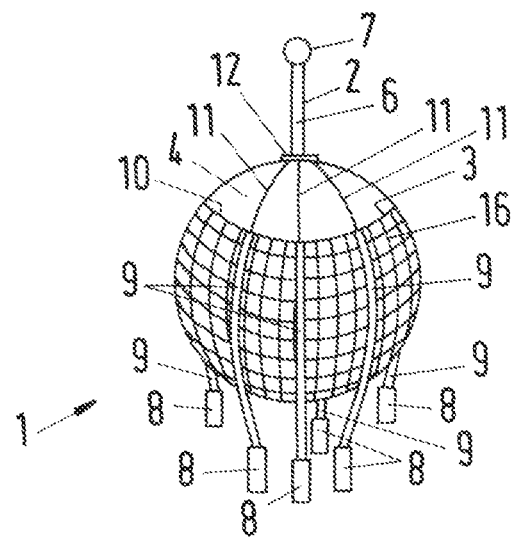
FIG. 5 shows a schematic view of a joint with a fiber tube according to an exemplary embodiment of the disclosure.

FIG. 5 shows a schematic view of a joint 1 with a fiber tube 16. The joint 1 shown in FIG. 5 is configured here substantially the same way as the joint 1 shown in FIG. 2, and reference may be made to the corresponding explanations concerning FIG. 2. In contrast to the exemplary embodiment illustrated in FIG. 2, it is illustrated that the connecting elements 9 are at least partially formed by a fiber tube 16. Fabric fibers connecting the connecting elements 9 to one another are arranged here between the connecting elements 9. Said fabric fibers can also lie on the surface of the head element 4, i.e., can be guided along the head element 4. Said fabric fibers can be capable of contraction. As a result, an undesirable slipping of the connecting elements 9 along the surface of the head element 4 is prevented, but a freedom of movement of the connecting elements required for the positioning is ensured.

It is possible for precisely one connecting element 9, a plurality of connecting elements 9 or all of the connecting elements 9 or a plurality of fabric fibers to be configured as elements for signal transmission. By this means, for example, a data line permitting a data connection via the joint 1 can be provided.

For example, it is possible for a fiber configured in such a manner to be guided out of the fiber tube 16 illustrated to the first joint element 5 (see FIG. 1 or FIG. 3) in order to ensure a connection for signaling purposes between the joint elements or elements arranged thereon.

Figure 6:
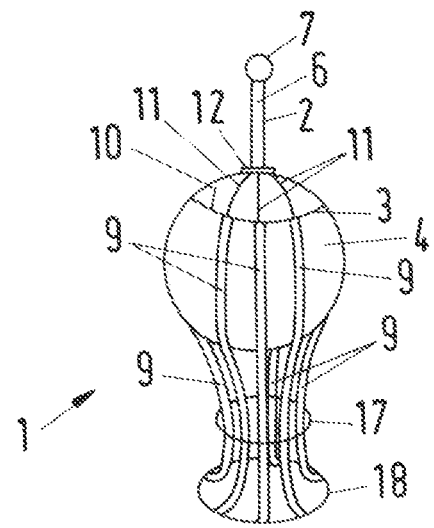
FIG. 6 shows a schematic view of a joint with a guide element according to an exemplary embodiment of the disclosure.

FIG. 6 shows a further schematic illustration of a joint 1 which, like the exemplary embodiment illustrated in FIG. 2, includes a socket element 3 with an annular element 10, and arms 11 which connect the annular element 10 to a fastening section 12 for the further joint element 2. Connecting elements 9 which are guided by the annular element 10 along the surface of the head element 4 to an annularly configured guide element 17 are likewise illustrated. This guide element 17 can be arranged in the previously explained plane of projection of the contour of the head element 4. It is illustrated that the connecting elements 9 are guided through the guide element 17 (i.e., through the through opening surrounded by the annular element 17) to a coupling element 18 and are connected to the latter. Therefore, a first end of the connecting element 9 is thus connected to the socket element 3 and a further end to the coupling element 18. Drive devices permitting a translation movement of the coupling element 18 in one, typically two or three, in particular linearly mutually independent, spatial directions and/or a rotational movement of the coupling element 18, in particular about a central axis of symmetry, are not illustrated. The number of drive devices and the configuration thereof can be selected here in accordance with the desired number of degrees of rotational freedom of the relative movement between head element 4 and socket element 3. For example, with the linear drive devices, the output elements of which can be moved along orthogonally to one another and orthogonally to the axis of rotation of the coupling element 18, a change in the relative position about two degrees of rotational freedom can be permitted. For a change of the relative position about a third additional degree of rotational freedom, a rotation drive device can be provided which rotates the coupling element 18 about its central axis of symmetry.

It is conceivable that the guide element 17 can also be moved with a linear and/or rotational movement by one or more drive devices, in particular in order to increase an actuating region for the relative position that is to be set or in order to control, in particular to minimize, a vibration behavior of the driven joint element (in this case of the further joint element 2).

Figure 7:
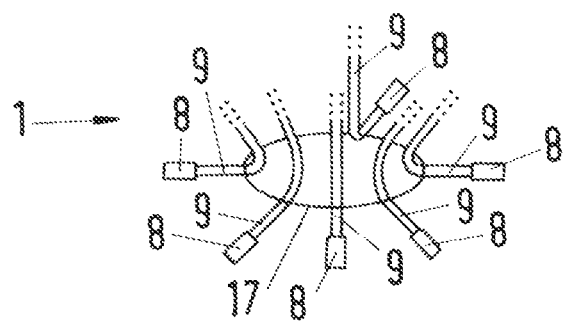
FIG. 7 shows a detailed view of a joint with a guide element according to an exemplary embodiment of the disclosure.

FIG. 7 shows a detailed view of a joint 1, wherein only drive devices 8, connecting elements 9 and a guide element 17 are illustrated. As illustrated in FIG. 6, said guide element 17 can be annular. It is illustrated here that the linear axes along which the output elements of the drive devices 8 are moved are arranged in a plane which is oriented perpendicularly to the central axis of symmetry of the guide element 17. This reduces the construction space required by the joint 1 along said central axis of symmetry, which results, inter alia, in a flat construction (with respect to the axis of symmetry).

Figure 8:
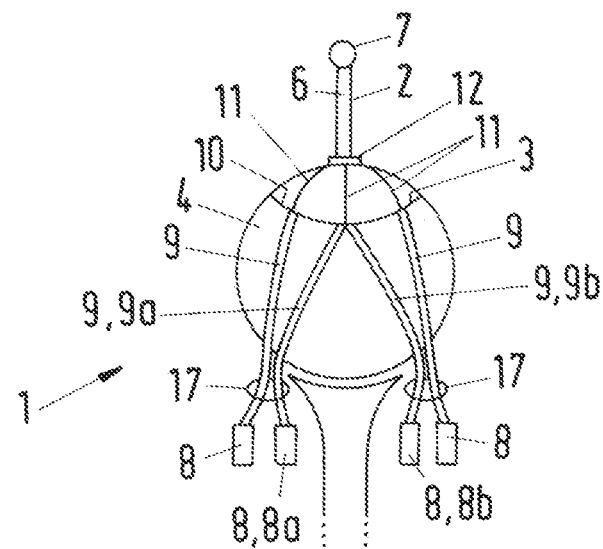
FIG. 8 shows a schematic view of a joint with guide elements in according to a further exemplary embodiment of the disclosure.

FIG. 8 shows a schematic view of a joint 1 in a further exemplary embodiment. The socket element 3 which includes an annular element 10, and arms 11 which connect the annular element 10 to a fastening section 12 for fastening the further joint element 2, which is configured as a tactile sensor, is illustrated. Connecting elements 9 which connect the annular element 3 to the drive devices 8 are likewise illustrated.

It is apparent that a first connecting element 9a connects the first drive device 8a to a fastening section on the socket element 3, in particular the annular element 10. It is likewise illustrated that a second connecting element 9b connects a second drive device 8b to the same fastening section.

Further connecting elements 9 connect other fastening sections to further drive devices 8. In order to ensure a desired guidance of the connecting elements 9, 9a, 9b along the surface of the head element 4, the joint 1 includes annular guide elements 17 through which the connecting elements 9 are guided to the drive devices 8, 8a, 8b.

Figure 9:
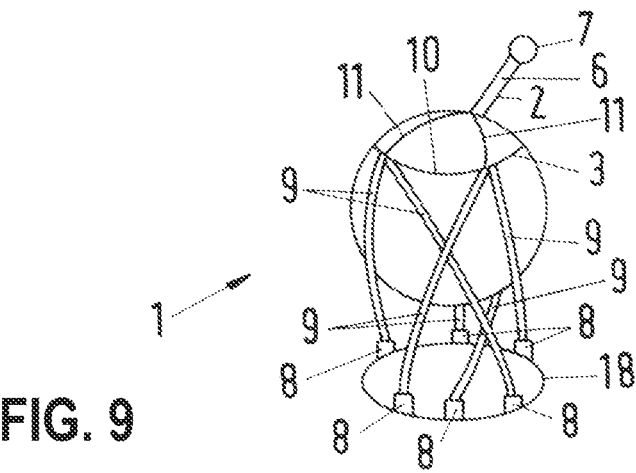
FIG. 9 shows a schematic view of a joint according to a further exemplary embodiment of the disclosure.

FIG. 9 shows a schematic view of a joint 1 in a further exemplary embodiment. It is illustrated here that connecting elements 9 connect the further joint element 2, in particular the annular element 10, to drive devices 8 which are arranged on a coupling element or at the coupling element 18. This coupling element 18 is also annular. A further drive device, not illustrated, can, for example, bring about a rotational movement of the annular coupling element 18 about its central axis of symmetry. It is likewise illustrated that two connecting elements 9 are always connected to the same fastening section on the socket element or annular element 10.

Figure 10:
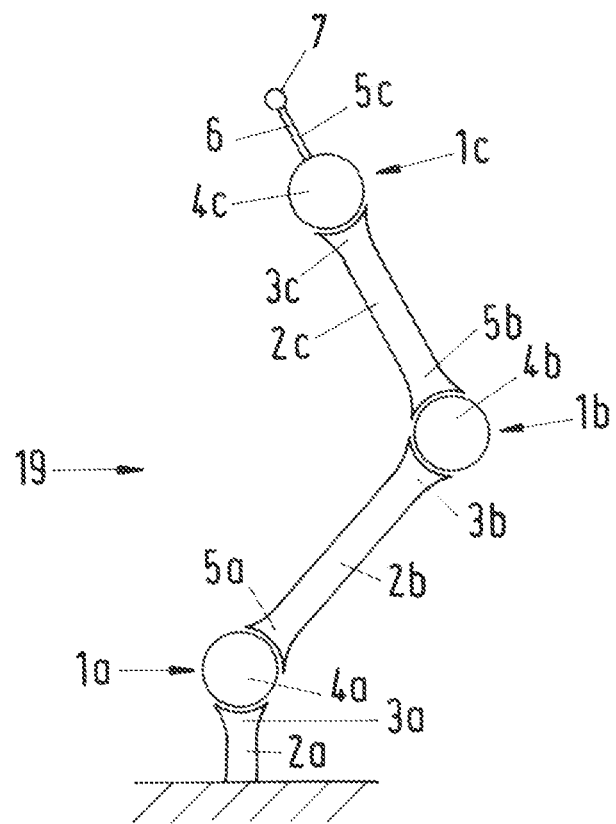
FIG. 10 shows a positioning device with a plurality of joints according to an exemplary embodiment of the disclosure.

FIG. 10 shows a schematic illustration of a positioning device 19 with a plurality of joints 1a, 1b, 1c. The various joint elements 2a, 2b, 2c, 5a, 5b, 5c which are connected to one another in a manner movable relative to one another via the respective joints 1a, 1b, 1c are also illustrated. The socket elements and head elements 3a, 4a, 3b, 4b, 3c, 4c of the joints 1a, 1b, 1c are also illustrated. For the sake of clarity, the illustration of the drive devices 8 and connecting elements 9 (see FIG. 1) has been dispensed with. However, it is conceivable that the corresponding drive devices are arranged on a joint element 2a, 5a, 2b, 5b, 2c, 5c or are arranged in a fixed position relative thereto.

It is understood that the foregoing description is that of the exemplary embodiments of the disclosure and that various changes and modifications may be made thereto without departing from the spirit and scope of the disclosure as defined in the appended claims.

LIST OF REFERENCE NUMERALS 1, 1a, 1b, 1c Joint
2, 2a, 2b, 2c Further joint element
3 Socket element
4, 4a, 4b, 4c Head element
5, 5a, 5b, 5c First joint element
6 Probe pin
7 Probe ball
8, 8a, 8b Drive device
9, 9a, 9b Connecting element
10 Annular element
11 Arm
12 Fastening section
13 Guide element, deflecting pulley
14 Position detection device
15 Element
16 Fiber tube
17 Element
18 Coupling element
19 Positioning device

What is claimed is:

1. A joint for connecting a first joint element to a further joint element, the joint comprising:
the first joint element;
the further joint element;
a head element;
a socket element; and
at least two drive devices,
wherein the head element is connected to or formed by the first joint element and the socket element is connected to or formed by the further joint element,
wherein the head element and the socket element are mounted on one another rotatably movably about at least three linearly independent axes of rotation, and
wherein the at least two drive devices are connected via at least one flexible connecting element to:
the head element or the first joint element, or
the socket element or the further joint element, and
wherein the at least one connecting element is guided at least section-wise along the head element, and
wherein the at least one connecting element lies on a section of the surface of the head element.

2. The joint as claimed in claim 1, wherein the at least two drive devices are linear drive devices.

3. The joint as claimed in claim 1, wherein the socket element comprises an annular element configured to rest on the head element, and arm elements, and
wherein the arm elements connect the annular element to the further joint element or are formed by the further joint element.

4. The joint as claimed in claim 1, further comprising a position detection device configured to detect a relative position between the socket element and the head element.

5. The joint as claimed in claim 4, wherein the head element and/or the socket element comprise/comprises at least one element for detection by the position detection device.

6. The joint as claimed in claim 1, wherein the connecting element or the connecting elements is or are formed by a fiber tube.

7. The joint as claimed in claim 1, wherein the at least one connecting element is configured as an element for data transmission or comprises the element for data transmission.

8. The joint as claimed in claim 1, wherein the connecting points or connecting sections in which the connecting elements are connected to an element differ from one another, or
wherein one element is connected in at least one connecting point or connecting section to at least two connecting elements.

9. The joint as claimed in claim 1, wherein at least one of the at least one connecting element is metallized, and
wherein the head element is formed from a non-conductive material.

10. The joint as claimed in claim 1, wherein the at least one connecting element is formed from a low-friction fiber material.

11. A coordinate measurement device comprising the joint for connecting the first joint element to the further joint element, as claimed in claim 1.

12. The coordinate measurement device as claimed in claim 11, further comprising:
a sensor,
wherein the first joint element forms a part of the sensor.

13. The coordinate measurement device as claimed in claim 11, further comprising:
a sensor; and
a sensor holder,
wherein the first joint element forms a part of the sensor holder.

14. The coordinate measurement device as claimed in claim 11, further comprising:
a sensor; and
a kinematic structure of a positioning device having two arms and being configured to position the sensor,
wherein the two arms of the kinematic structure of the positioning device provided by the joint elements are connected by the joint.

15. A method for operating the joint as claimed in claim 1, the method comprising:
actuating the at least two drive devices for setting a desired relative position between the first joint element and the further joint element.

16. The method as claimed in claim 15, wherein the actuating is carried out on an assignment basis, and
wherein the assignment of control variables of the at least two drive devices to a relative position is determined by machine learning methods.

17. The method as claimed in claim 15, further comprising:
detecting an actual relative position between the socket element and the head element;
generating an actuating variable for the desired relative position between the socket element and the head element based on the actual relative position between the socket element and the head element; and actuating the at least two drive devices based on the actuating variable.

\* \* \* \* \*